(12) United States Patent
Liu (10) Patent No.: US 8,717,160 B2
(45) Date of Patent: May 6, 2014

(54) METHOD AND APPARATUS FOR ELECTRIC POWERED VEHICLE RECHARGING SAFETY

(71) Applicant: Futurewei Technologies, Inc., Plano, TX (US)

(72) Inventor: Jinshui Liu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/889,167

(22) Filed: May 7, 2013

(65) Prior Publication Data

US 2013/0241724 A1   Sep. 19, 2013

Related U.S. Application Data

(62) Division of application No. 12/822,479, filed on Jun. 24, 2010, now Pat. No. 8,531,284.

(60) Provisional application No. 61/220,068, filed on Jun. 24, 2009.

(51) Int. Cl.
*B60Q 1/00* (2006.01)

(52) U.S. Cl.
USPC ........ 340/455; 340/636.2; 320/107; 320/109; 439/911

(58) Field of Classification Search
USPC ............. 340/455, 636.2, 636.3, 568.4, 693.1; 320/107, 108, 109; 439/136, 142, 144, 439/668, 911, 924.1
See application file for complete search history.

(56) References Cited

U.S. PATENT DOCUMENTS

| 4,158,802 A | 6/1979 | Rose, II |
| 5,202,617 A | 4/1993 | Nor |
| 5,220,268 A | 6/1993 | Rose et al. |
| 5,306,999 A * | 4/1994 | Hoffman ........................ 320/109 |
| 5,344,331 A * | 9/1994 | Hoffman et al. ............... 439/138 |

(Continued)

FOREIGN PATENT DOCUMENTS

| DE | 102006028119 A1 | 12/2007 |
| EP | 0635908 A2 | 1/1995 |

(Continued)

OTHER PUBLICATIONS

Foreign Communication From a Counterpart Application, PCT Application PCT/US2010/039775, International Search Report dated Jan. 21, 2011, 8 pages.

(Continued)

*Primary Examiner* — Hung T. Nguyen
(74) *Attorney, Agent, or Firm* — Conley Rose, P.C.; Grant Rodolph; Brandt D. Howell (57) ABSTRACT

An apparatus comprising at least one processor coupled to a memory and configured to receive a signal from a component in a recharging inlet of an electric powered vehicle (EPV) recharging inlet, determine whether the signal indicates that a housing cap is not properly mounted on the recharging inlet, and alert a driver if the signal indicates that the housing cap is not properly mounted on the recharging inlet, wherein the signal comprises an electric voltage level, and wherein an "UNMATED" voltage level indicates that the housing cap is not properly mounted on the recharging inlet, and wherein a "MATED" voltage level indicates that the housing cap is properly mounted on the recharging inlet.

17 Claims, 6 Drawing Sheets

(56) References Cited

U.S. PATENT DOCUMENTS

| | | | |
|---|---|---|---|
| 5,346,406 A | 9/1994 | Hoffman et al. | |
| 5,462,439 A | 10/1995 | Keith | |
| 5,478,250 A | 12/1995 | Hoffman | |
| 5,490,790 A | 2/1996 | Okada | |
| 5,545,046 A * | 8/1996 | Masuda et al. | 439/142 |
| 5,596,258 A | 1/1997 | Kimura et al. | |
| 5,751,135 A | 5/1998 | Fukushima et al. | |
| 5,758,414 A * | 6/1998 | Ehrenfels | 29/857 |
| 6,123,569 A | 9/2000 | Fukushima et al. | |
| 6,225,153 B1 | 5/2001 | Neblett et al. | |
| 6,397,791 B1 | 6/2002 | Brister | |
| 7,595,606 B2 | 9/2009 | Loubeyre | |

FOREIGN PATENT DOCUMENTS

| | | |
|---|---|---|
| EP | 1883135 A1 | 1/2008 |
| FR | 2775351 A1 | 8/1999 |
| FR | 2793450 A1 | 11/2000 |
| FR | 2856015 A1 | 12/2004 |
| WO | 2009035531 A2 | 3/2009 |

OTHER PUBLICATIONS

Foreign Communication From a Counterpart Application, PCT Application PCT/US2010/039775, Written Opinion dated Jan. 21, 2011, 12 pages.

"Power S3—16/32A Charge Plug SAE J1772," Charge Connector, 16/32A, Mar. 2010, 24 pages.

Office Action dated Jan. 31, 2013, 13 pages, U.S. Appl. No. 12/822,479, filed Jun. 24, 2010.

Notice of Allowance dated Sep. 20, 2013, 14 pages, U.S. Appl. No. 13/865,014, filed Apr. 17, 2013.

Notice of Allowance dated May 2, 2013, 8 pages, U.S. Appl. No. 12/822,479, filed Jun. 24, 2010.

Office Action dated Jul. 25, 2013, 12 pages, U.S. Appl. No. 13/865,014, filed Apr. 17, 2013.

* cited by examiner

METHOD AND APPARATUS FOR ELECTRIC POWERED VEHICLE RECHARGING SAFETY

CROSS-REFERENCE TO RELATED APPLICATIONS

This application is a divisional of U.S. patent application Ser. No. 12/822,479 filed Jun. 24, 2010, which claims priority to U.S. Provisional Patent Application No. 61/220,068 filed Jun. 24, 2009 both of which are by Jinshui Liu, entitled "Method and Apparatus for Electric Powered Vehicle Recharging Safety", and are incorporated herein by reference as if reproduced in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An electric vehicle (EV), also referred to as an electric powered vehicle (EPV), is a vehicle which uses one or more electric motors for propulsion. EPVs include electric cars that use electric motors for propulsion in place of more common propulsion systems, such as the internal combustion engine (ICE). Electric cars are commonly powered by on-board battery packs, and as such are battery electric vehicles (BEVs). Although electric cars often give good acceleration and have generally acceptable top speed, the poor energy capacity of batteries compared to that of fossil fuels causes the electric cars to have relatively poor range between charges, and consequently recharging can take significant lengths of time. However, for everyday use rather than long journeys, electric cars are practical means of transportation and can be recharged overnight at acceptable cost. Electric cars are expected to have an impact in the auto industry given advantages in city pollution, less dependence on oil, and expected rise in gasoline prices.

SUMMARY

In one embodiment, the disclosure includes an apparatus comprising a recharging inlet inside an EPV, a light source coupled to the inside wall of the EPV recharging inlet, a light detector located within the EPV recharging inlet and positioned between the recharging inlet pins and the light source, and a plurality of threads around the inside wall of the recharging inlet and positioned between the light source and the light detector, wherein the light detector is configured to detect light from the light source and/or external light, wherein the threads are configured to receive a housing cap that substantially blocks light from the light source and external light from reaching the light detector when the housing cap is properly mounted onto the EPV recharging inlet, and wherein the threads are configured to allow light from at least one of the light sources and external light to reach the light detector when the housing cap is not properly mounted onto the EPV recharging inlet.

In another embodiment, the disclosure includes an apparatus comprising a charging pin in a recharging inlet of an EPV recharging inlet, a ground pin in the recharging inlet and substantially parallel to the charging pin, a safety pin in the recharging inlet and substantially parallel to the charging pin and the ground pin, a electric power source coupled to the safety pin, and a control circuit coupled to the electric power source and the safety pin, wherein the length of the safety pin extended in the recharging inlet is substantially shorter than the length of the ground pin and longer than the length of the charging pin.

In yet another embodiment, the disclosure includes an EPV system component comprising at least one processor coupled to a memory and configured to receive a signal from a component in a recharging inlet, determine if the signal indicates that a housing cap is not properly mounted on the recharging inlet, and alert a driver if the signal indicates that the housing cap is not properly mounted on the recharging inlet.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

EPVs are being promoted in many countries, such as Germany and the USA, and are becoming more popular for their potential benefits in managing global climate change and reducing worldwide air pollution. EPVs may have limited battery storage, and hence their batteries may need to be recharged often. Typically, since the EPVs' battery recharging time may last many hours or minutes, the EPVs may be used for commuting or transportation during day time and may have their batteries recharged during night time, for instance using recharging stations at garages. Because of the time duration needed to recharge the battery, it may be possible to forget that a vehicle is connected to a recharging station and drive the vehicle away without disconnecting the vehicle from the recharging station. Driving the vehicle without properly disconnecting the vehicle from the recharging station may cause damages to the vehicle and/or the recharging station, and possibly to other vehicles that may be in close proximity.

A plurality of schemes related to recharging EPVs have been proposed, such as in U.S. Pat. No. 6,123,569 by Fukushima et al., U.S. Pat. No. 5,220,268 by Rose et al., U.S. Pat. No. 5,490,790 by Okada, U.S. Pat. No. 5,462,439 by Keith, and other U.S. patents, as well as the J1772 standard adopted by Society of Automotive Engineers (SAE) in January 2010. Many of the proposed schemes are related to connector assembly designs of the electric powered vehicle systems. For instance, in U.S. Pat. No. 5,346,406 by Hoffman et al., a connector assembly is disclosed. The connector assembly comprises a control contact that is shorter than the current carrying conductors. As such, the charging current path may be disconnected if the vehicle moves away from the recharging station while the vehicle remains electrically coupled to the recharging station, e.g. by an electric cable. One disadvantage of this system is that mechanical damage by the electric cable to the vehicle and/or the recharging station may occur even if the charging current path is disconnected. In another U.S. Pat. No. 4,158,802 by Rose, a recharging station design that uses exposed surface current contact is disclosed. Some of the disadvantages of this design may include contact surface corrosion, potential electrical shock due to accidental touch of the electric surface contact, and supporting a limited range of sizes and/or shapes of electric powered vehicles. All of the patents mentioned above are incorporated herein by reference as if reproduced in their entirety. While the schemes above disclose improved connector assembly designs for EPV systems, the previous schemes may not prevent damages to vehicles and/or recharging stations. The SAE J1772 standard specifies a proximity detection method by putting a permanent magnet in the recharging connector and corresponding Hall Effect switch in the vehicle recharging inlet to detect the presence of the connector in the vehicle inlet, but leaves the details at the discretion of the EPV manufacturer.

Disclosed herein are systems and methods for EPV recharging safety detection, which may be used to prevent at least some damages to vehicles and/or recharging stations. The disclosed systems and methods may also overcome at least some of the disadvantages of the previous schemes, such as supporting a plurality of sizes and shapes of EPVs and recharging stations. The methods herein comprise schemes for detecting a coupling between a recharging inlet of the EPV and a housing cap, and alerting a driver if the housing cap is not coupled properly to the recharging inlet. When alerted, the driver may avoid moving the vehicle before removing the recharging cable and mounting the housing cap properly onto the recharging inlet, which may prevent damages caused by the recharging cable to the EPV and/or the recharging station. In some embodiments, the methods may prevent the driver from moving the vehicle if the housing cap is not coupled properly to the recharging inlet.

Figure 1:
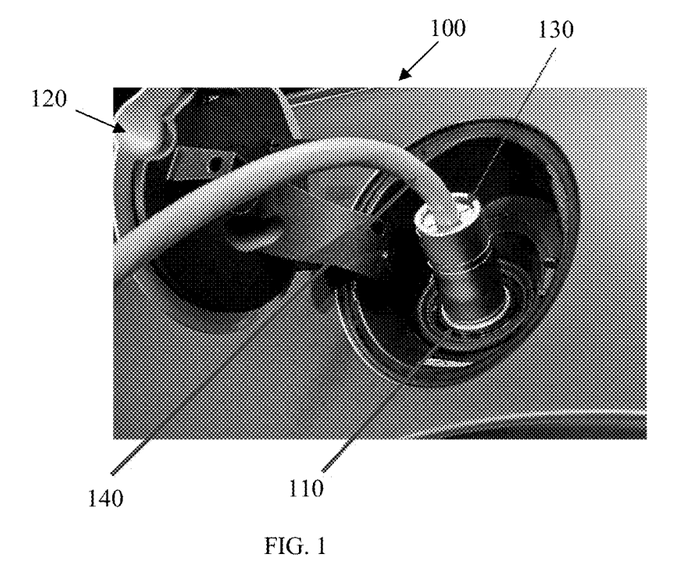
FIG. 1 is a perspective view of an EPV recharging apparatus.

FIG. 1 shows a perspective view of an embodiment of an EPV recharging apparatus 100, which may be used to recharge a vehicle's battery, for example during night time. The EPV may be an electric vehicle (e.g. electric car) powered by a rechargeable battery or a hybrid powered vehicle (e.g. hybrid car) that uses gasoline, diesel, or natural gas and a battery rechargeable by an external electric power source. In both types of vehicles, the battery may be recharged by a recharging station. The recharging station may comprise a device or an apparatus that provides electric power to recharge the battery in the EPV. The recharging station may be located at a household (e.g. house garage) or a public facility to provide vehicle recharging service.

The EPV recharging apparatus 100 may comprise a recharging inlet 110 that may be coupled electrically to the battery and a housing cap 120. During battery recharging, the recharging cable 140 (wherein the recharging plug 130 is part of the recharging cable 140) is plugged into the recharging inlet 110. The housing cap 120 may be coupled to or mounted on the recharging inlet 110 when the vehicle is on the move, e.g. during day time, to protect the recharging inlet. The housing cap 120 may also be used to prevent electrical contact with the pins in the recharging inlets and improve safety. Although the recharging inlet 110 and the housing cap 120 in FIG. 1 have a cylindrical shape, other embodiments of the EPV recharging apparatus 100 may comprise different shapes and/or sizes for the recharging inlet 110 and the housing cap 120.

To recharge the vehicle's battery, the housing cap 120 may be removed from the recharging inlet 110 and a recharging cable 140, which may be coupled to the recharging station, may be coupled to or plugged in the recharging inlet 110. As such, the recharging station may provide power (e.g. electrical current) to the battery via the recharging cable and components in the recharging inlet 110.

Figure 2:
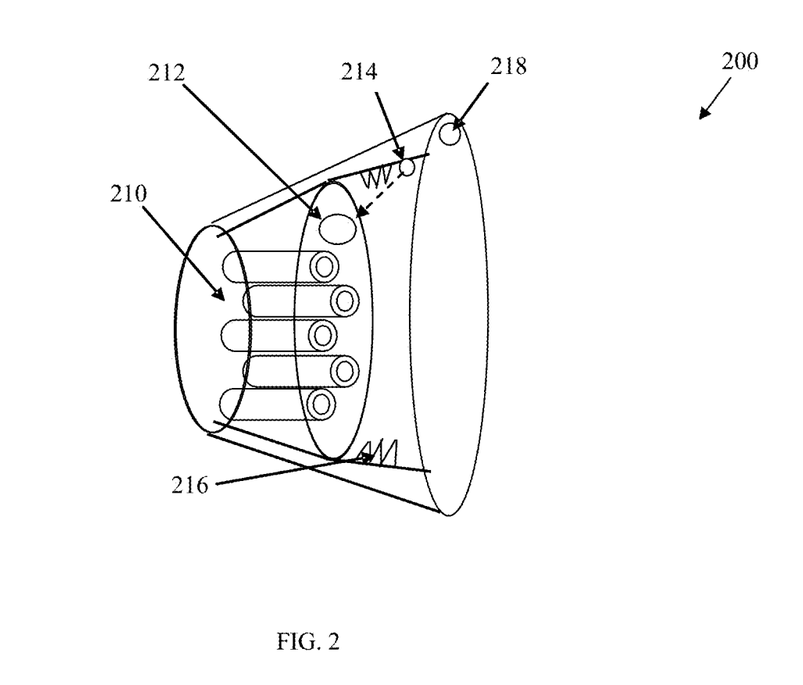
FIG. 2 is a schematic diagram of an embodiment of an EPV recharging inlet.

FIG. 2 illustrates an embodiment of an EPV recharging inlet 200, which may be configured to provide EPV recharging safety detection and prevent the recharging cable from damaging the vehicle and/or the recharging station. For example, the EPV recharging inlet 200 may correspond to the recharging inlet 110 in the EPV recharging apparatus 100. The EPV recharging inlet 200 may comprise a plurality of pins 210 for regular EPV recharging, e.g. those defined in SAE J1772 specification, a first light detector 212, a light source 214, a plurality of threads 216 for cap mounting, and optionally a second light detector 218, which may be configured and arranged as shown in FIG. 2.

The recharging pins 210 may be positioned inside the EPV recharging inlet 200, e.g. at a center location from the inside wall of the EPV recharging inlet 200, and adjacent to the inside wall of the vehicle facing the front side of the EPV recharging inlet 200. The recharging pins 210 may comprise a plurality of pins/connectors that may be coupled to a rechargeable battery in the vehicle, e.g. via electric wiring. When a recharging cable is coupled to the EPV recharging inlet 200, a plurality of pins/connectors in the recharging cable may be aligned to and placed in contact to the corresponding pins/connectors in the recharging inlet 200 to provide power/current from the recharging station to the battery.

The first light detector 212 may be a photodiode (or any other type of photodetector) and may be positioned at the inside wall of the EPV recharging inlet 200, e.g. at relatively close proximity to the recharging pins 210. The first detector may be configured to detect incoming light from the edge (e.g. front side) of the EPV recharging inlet 200, such as light emitted by the light source 214 and/or external light. The light source 214 may be a light-emitting diode (LED) (or any other type of light emitting source) and may also be positioned at the inside wall of the EPV recharging inlet 200 but further from the recharging pins 210 than the first light detector 212. The light source 214 may be placed at relatively close proximity to the edge of the EPV recharging inlet 200. For example, the light source 214 may be positioned between the first light detector 212 and the second light detector 218. Additionally, the light source 214 may be aligned to emit light in the direction of the first light detector 212. The light source 214 may emit light continuously or intermittently, e.g. at a predetermined period, to save battery power. The period of turning on or off the light source 214 may be adjusted based on available battery power and/or the availability of external light.

The threads 216 may also be positioned at the inside wall of the EPV recharging inlet 200, between the first light detector 212 and the light source 214. Specifically, the threads 216 may be aligned to enable the first detector to detect the light emitted from the light source 214 when the housing cap is not properly mounted onto the EPV recharging inlet 200. The height or extent of the threads 216 from the inside wall of the EPV recharging inlet 200 may be limited to prevent blocking the light trajectory from the light source 214 to the first light detector 212, as indicated by the dashed arrow line in FIG. 2. The threads 216 may also be aligned to interlock with corresponding threads located around the outside wall of part of a housing cap (e.g. the housing cap 120) to properly mount the housing cap onto the EPV recharging inlet 200. For example, an extended part at the center of the housing cap may be screwed in or twisted inside the EPV recharging inlet 200 to interlock the threads 216 with the threads of the housing cap. In this case, the light trajectory from the light source 214 (and from outside the EPV recharging inlet 200) to the first light detector 212 may be blocked and the first light detector 212 may not detect a significant amount of light.

The second light detector 218 may also be a photodiode (or any other type of light detector) and may be positioned at the inside wall of the EPV recharging inlet 200 behind the light source 214 at about the edge of the EPV recharging inlet 200, e.g. close to the outside space around the EPV recharging inlet 200. The second light detector 218 may be configured to detect external light from outside the EPV recharging inlet 200.

Figure 3:
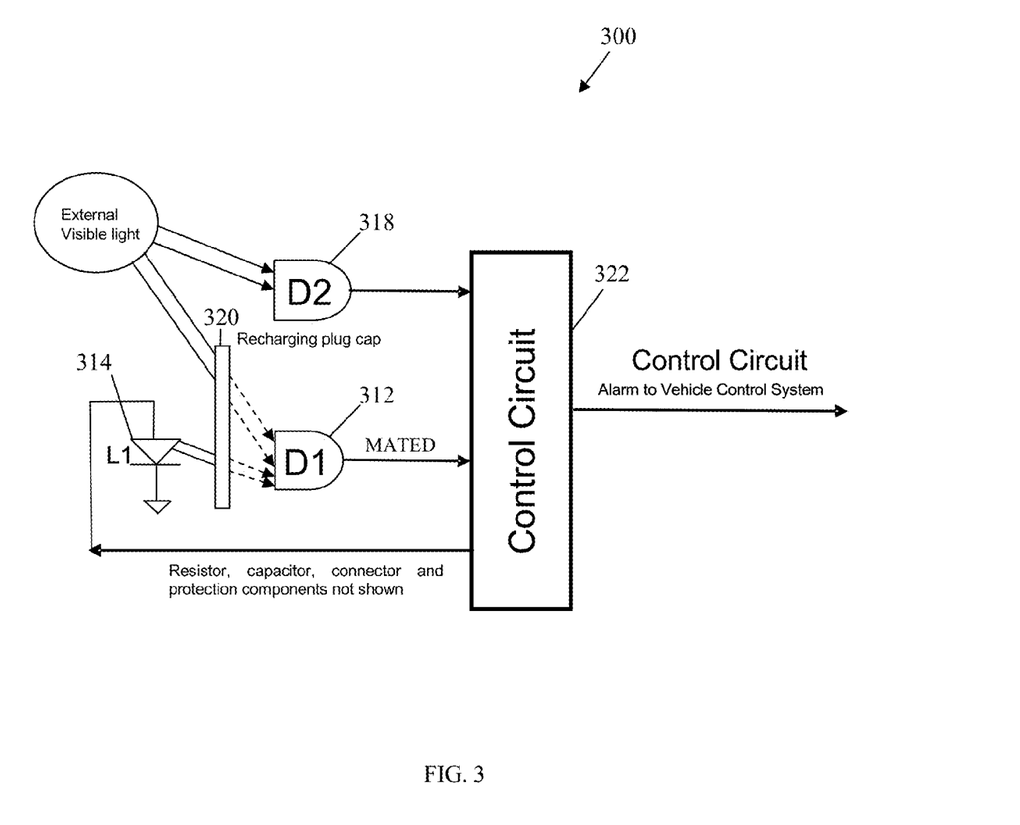
FIG. 3 is a schematic diagram of an embodiment of an EPV recharging safety detection system.

FIG. 3 illustrates an embodiment of an EPV recharging safety detection system 300, which may use an optical detection scheme. The EPV recharging safety detection system 300 may be used to detect whether a housing cap is properly coupled to an EPV recharging inlet, such as the EPV recharging inlet 200, and to alert a driver if the housing cap is not mounted properly. The EPV recharging safety detection system 300 may comprise a first light detector (D1) 312, a light source (L1) 314, and optionally a second light detector (D2) 318, which may be configured substantially similar to the corresponding components of the EPV recharging inlet 200. The EPV recharging safety detection system 300 may also comprise a cap part 320 of a housing cap and a control circuit 322 that may be coupled to L1, D1, and D2.

When the housing cap is properly mounted onto the EPV recharging inlet, the cap part 320 may block the light emitted from L1 and the external visible light from reaching D1. In this case, D1 may not detect any significant light and the output from D1 to the control circuit 322 may indicate a "MATED" status. If the cap part 320 is properly positioned in the EPV recharging inlet, the housing cap may be properly mounted after removing the recharging cable. Therefore, the driver may drive away without damaging the vehicle and/or the recharging station.

Alternatively, if the housing cap is removed or is not properly mounted onto the EPV recharging inlet, the cap part 320 may not block at least a portion of the light emitted from L1 and/or the external visible light from reaching the D1. In this case, D1 may detect at least some amount of light, and hence send a signal to the control circuit 322, which may be located in the vehicle. For instance, the control circuit 322 may detect an "UNMATED" status from D1. Upon receiving the signal from the first light detector 312, the control circuit 322 may alert the driver of a safety issue regarding the EPV recharging apparatus, e.g. by sending an alarm to a vehicle control system and/or preventing the vehicle from moving. When the driver receives an alarm from the vehicle control system, the driver may verify whether the recharging cable is properly removed from the EPV recharging inlet and/or whether the housing cap is properly mounted onto the EPV recharging inlet before attempting to drive away. In some embodiments, if D1 detects light from L1 and/or external light, the control circuit 322 may alert the driver and prevent the driver from operating the vehicle. The control circuit 322 may then allow the driver to operate the vehicle after properly mounting the housing cap, e.g. when D1 does not detect a significant amount of light.

Additionally, D2 may be configured to detect the intensity of the external visible light to determine if the amount of external light is sufficient for determining whether the housing cap is properly mounted without using L1. For instance, during day time the intensity of the external visible light may be relatively high, e.g. in comparison to night time. Thus, D2 may signal the control circuit 322 to turn off L1, and thus D1 may detect the external visible light, but not light from L1 to determine whether the housing cap is properly mounted. For instance, the control circuit 322 may detect a substantial voltage or current output from D2 that corresponds to the intensity of light detected. However, during night time, the intensity of the external visible light may be significantly lower, and thus D2 may signal the control circuit 322 to turn on L1. For instance, the control circuit 322 may detect a substantial voltage or current output from D2 that corresponds to the low intensity of external light. In another embodiment, L1 may be turned on or off intermittently (by the control circuit 322) at a period that may be adjusted based on the detected intensity of the external visible light. For example, the time period for turning on or off L1 during day time may be longer than the time period for turning on or off L1 during night time. In other embodiments, the EPV recharging safety detection system 300 may not comprise D2 and/or L1, and D1 may use the external visible light and/or L1 to determine whether the housing cap is properly mounted.

Figure 4:
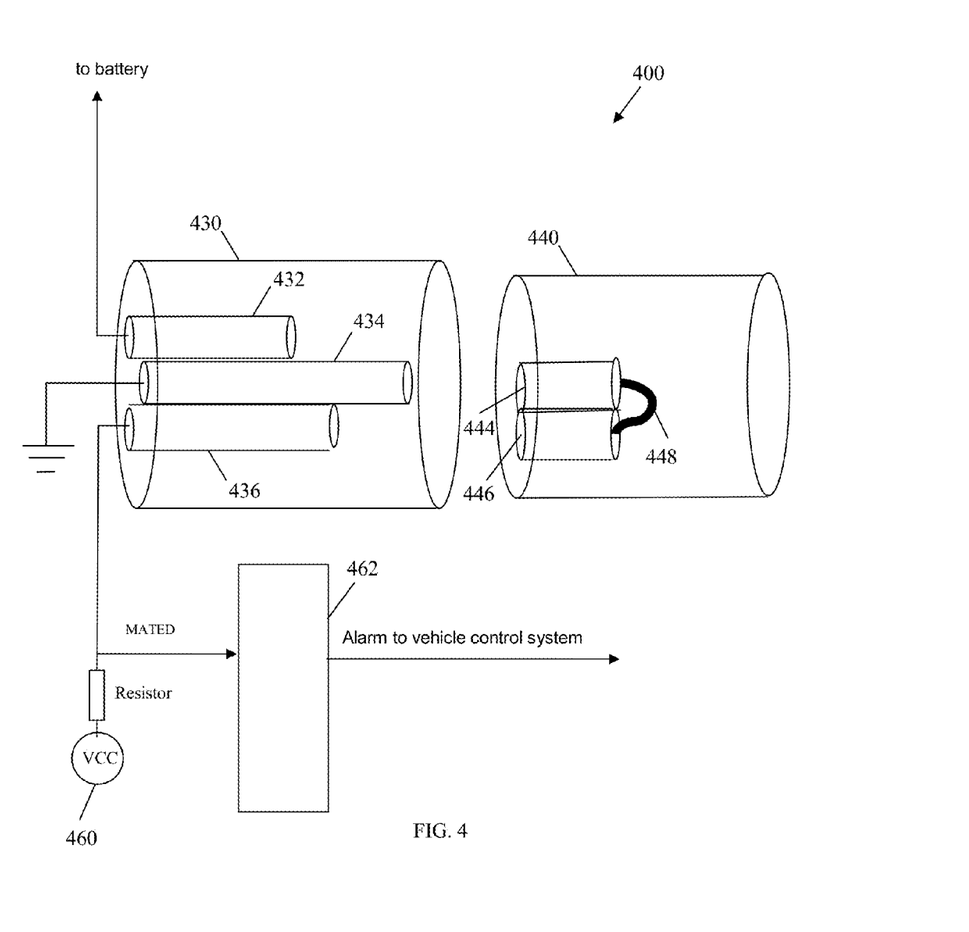
FIG. 4 is a schematic diagram of another embodiment of an EPV recharging safety detection system.

FIG. 4 illustrates an embodiment of another EPV recharging safety detection system 400, which may use an electrical detection scheme. Similar to the EPV recharging safety detection system 300, the EPV recharging safety detection system 400 may be used to detect whether a housing cap is properly coupled to an EPV recharging inlet, e.g. the EPV recharging inlet 200, and to alert a driver if the housing cap is not mounted properly. The EPV recharging safety detection system 400 may comprise a recharging inlet 430, which may comprise a charging pin 432, a ground pin 434, and a safety pin 436, and some other pins required for EPV recharging, e.g. those defined in SAE J1772 specification. The charging pin 432 may be coupled to the vehicle's battery, the ground pin 434 may be coupled to an electric ground for the circuitry in the vehicle, and the safety pin 436 may be coupled to the vehicle's control system.

In the EPV recharging safety detection system 400, a cap part 440 (e.g. in the housing cap) may match the recharging inlet 430. The cap part 440 may comprise a plurality of slots that correspond to the pins of the recharging inlet 430, which may comprise a ground pin slot 444, and a safety pin slot 446. The ground pin slot 444 may be coupled to the safety pin slot 446, for instance via an internal conductor 448. Alternatively, the ground pin slot 444 and the safety pin slot 446 may be a single component in the cap part 440 that comprises two slots. In an alternative embodiment, the ground pin slot 444, safety pin slot 446, and internal conductor 448 may be part of the recharging plug, e.g. recharging plug 130 of EPV recharging apparatus 100. The SAE adopted J1772 standard specifies a 5-pin recharging plug including a ground pin slot, e.g. ground pin slot 444 of cap part 440.

The EPV recharging safety detection system 400 may also comprise a Direct Current (DC) voltage source 460 that may be coupled to the safety pin 436 and a control circuit 462 that may be coupled to the voltage source 460 and located in the vehicle. Typically the voltage source 460 is the vehicle battery or a regulated voltage source derived from the vehicle battery. Although the recharging inlet 430, the cap part 440, and their corresponding pins and slots in FIG. 4 have a cylindrical shape, other embodiments of the EPV recharging apparatus may comprise different shapes and/or sizes for such components.

As shown in FIG. 4, the charging pin 432, the ground pin 434, and the safety pin 436 may be located inside the recharging inlet 430. The charging pin 432, the ground pin 434, and the safety pin 436 may be metal conductors and may extend from the back side of the recharging inlet 430, e.g. adjacent to the inside wall of the vehicle. As such, the charging pin 432, the ground pin 434, and the safety pin 436 may face the front side of the EPV recharging inlet. Further, the charging pin 432, the ground pin 434, and the safety pin 436 may have different lengths. Specifically, the length of the safety pin 436 may be substantially shorter than the length of the ground pin 434 and the entire length of the recharging inlet 430.

The ground pin slot 444 and the safety pin slot 446 may extend at least a portion of the length of the cap part 440. When the housing cap is properly coupled to the EPV recharging inlet 430, the pins of the recharging inlet 430 may be plugged into the corresponding slots of the cap part 440. As such, the ground pin 434, the ground pin slot 444, the internal conductor 448, the safety pin slot 446, and the safety pin 436 may establish a closed loop and ground any current provided by the DC voltage source 460. Consequently, when the housing cap is properly coupled to the recharging inlet 430, the control circuit 462 may detect a "MATED" voltage level on the signal "MATED." Since the safety pin 436 is substantially shorter than the recharging inlet 430 and the ground pin 434, the closed loop may not be established unless the cap part 440 is substantially inserted into and properly mounted on the recharging inlet 430. In this case, the driver may drive away without damaging the vehicle and/or the recharging station.

However, if the cap part 440 is not substantially inserted into the recharging inlet 430 and the housing cap is not properly mounted on the recharging inlet 430, the safety pin 436 may not be in contact with the safety pin slot 446 and the closed loop may not be established. Consequently, the control circuit 462 may detect an "UNMATED" voltage level on the signal "MATED" and, in response, send an alarm to the vehicle control system. When, the driver receives an alarm from the vehicle control system, the driver may verify whether the recharging cable is properly removed from the recharging inlet 430 and/or whether the housing cap is properly mounted onto the recharging inlet 430 before attempting to drive away. In some embodiments, if the control circuit 462 detects an "UNMATED" voltage level on the signal "MATED," then the control circuit 462 may alert the driver and prevent the driver from operating the vehicle. The control circuit 462 may then allow the driver to operate the vehicle after properly mounting the housing cap, e.g. when a "MATED" voltage level is detected on the signal "MATED."

In the alternative embodiment wherein the ground pin slot 444, safety pin slot 446, and internal conductor 448 may be part of the recharging plug, the control circuit 462 may detect a "MATED" voltage level on the signal "MATED" when the recharging plug is removed from the recharging inlet 430, and an "UNMATED" voltage level on the signal "MATED" when the recharging plug is properly plugged into the recharging inlet 430, and the rest functions in the same way as described above.

Figure 5:
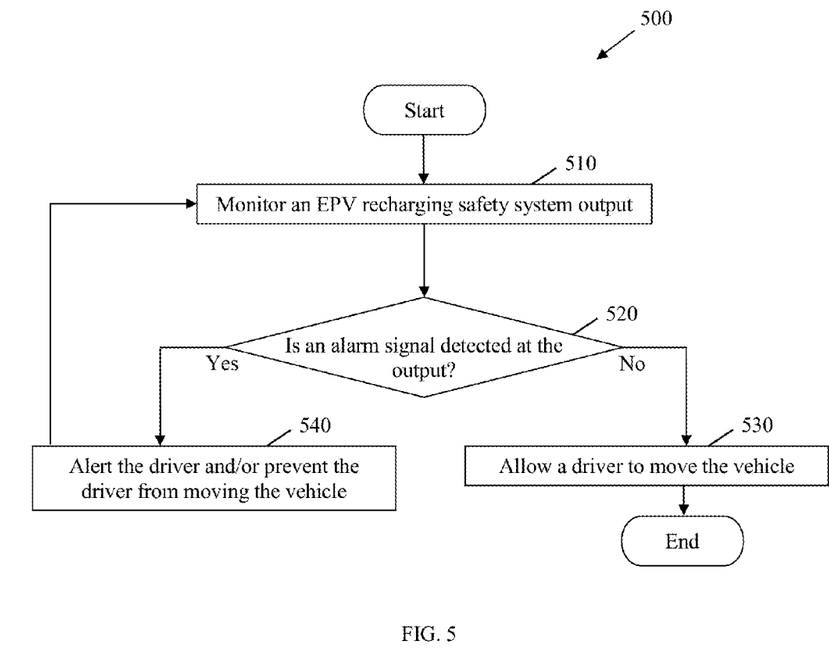
FIG. 5 is a schematic diagram of an embodiment of an EPV recharging safety detection method.

FIG. 5 illustrates an embodiment of an EPV recharging safety detection method 500, which may be used to detect whether a housing cap is properly coupled to an EPV recharging inlet, e.g. the EPV recharging inlet 200, and to alert a driver if the housing cap is not mounted properly. The method 500 may start at block 510, where an EPV recharging safety system output may be monitored, e.g. when the vehicle is turned off during night time. For instance, a vehicle control system may monitor the output of the EPV recharging safety system, e.g. as described in the EPV recharging safety detection system 300 or the EPV recharging safety detection system 400. The output may correspond to a voltage level output from a light detector (e.g. D1) in the case of an optical detection scheme or to a voltage level output from a DC power source (e.g. voltage source 460) coupled to a safety pin in the case of an electrical detection scheme. At block 520, the method 500 may determine whether an alarm signal is detected at the output. The alarm signal may correspond to an "UNMATED" voltage level on the "MATED" signal output in the EPV recharging safety detection system 300 or in the EPV recharging safety detection system 400. The method 500 may proceed to block 530 if the condition in block 520 is not met. Otherwise, if the condition in block 520 is met, then the method 500 may proceed to block 540.

At block 530, the driver may be allowed to move (or operate) the vehicle. Since the output of the EPV recharging safety system does not indicate an alarm, the housing cap may be properly mounted on the recharging inlet. Therefore, the driver may drive away without causing the recharging cable to damage the vehicle and/or the recharging station. The method 500 may then end. Alternatively, at block 540, the driver may be alerted and/or prevented from moving the vehicle. Since the output of the EPV recharging safety system indicates an alarm, the housing cap may not be properly mounted or the recharging cable may be coupled to the EPV recharging inlet. The recharging cable coupled to the recharging inlet may cause damage to the vehicle and/or the recharging station if the driver drives away without properly removing the recharging cable. The method 500 may then return to block 510 to resume monitoring the EPV recharging safety system output, e.g. until the housing cap is properly mounted on the recharging inlet.

Figure 6:
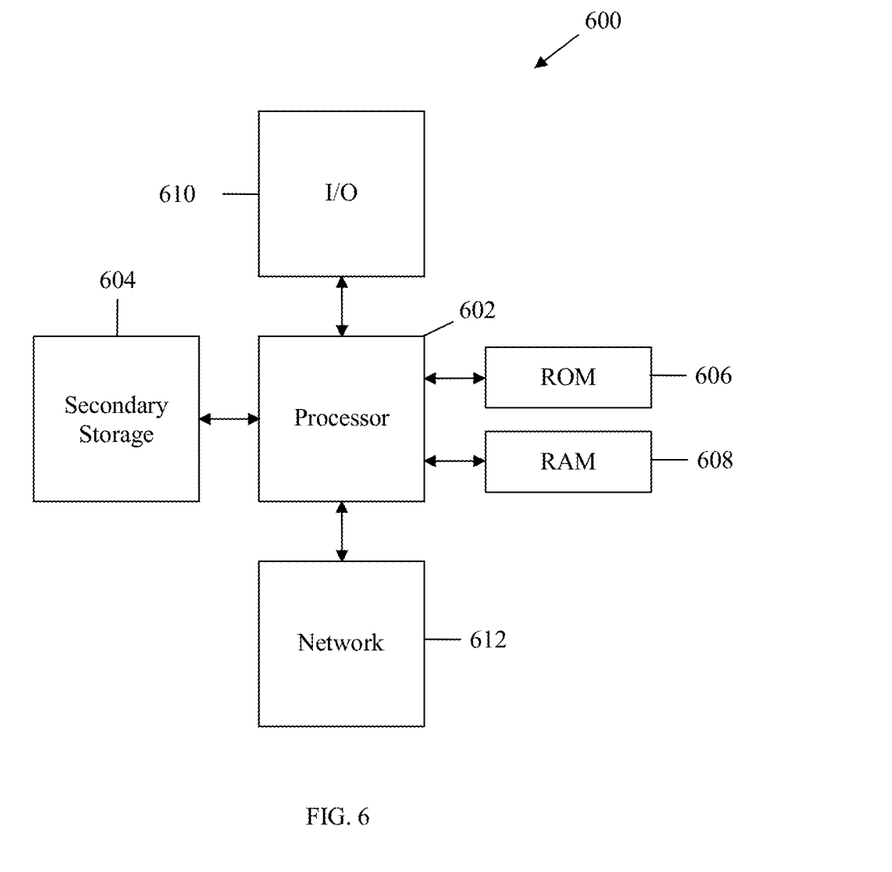
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   at least one processor coupled to a memory and configured to:
   receive a signal from a component in a recharging inlet of an electric powered vehicle (EPV) recharging inlet;
   determine whether the signal indicates that a housing cap is not properly mounted on the recharging inlet; and
   alert a driver if the signal indicates that the housing cap is not properly mounted on the recharging inlet, wherein the signal comprises an electric voltage level, and wherein an "UNMATED" voltage level indicates that the housing cap is not properly mounted on the recharging inlet, and wherein a "MATED" voltage level indicates that the housing cap is properly mounted on the recharging inlet.

2. The apparatus of claim 1, wherein the "UNMATED" voltage level is detected where a light detector detects substantial light in the recharging inlet, and wherein the "MATED" voltage level is detected where the light detector does not detect substantial light in the recharging inlet.

3. The apparatus of claim 2, wherein the processor is further configured to:
   receive a second signal from a second light detector in the recharging inlet;
   determine if the second signal indicates that external light intensity is sufficient to determine without using the signal from the light source that the housing cap is not properly mounted on the recharging inlet; and
   turn off the light source if external light intensity is sufficient to determine that the housing cap is not properly mounted on the recharging inlet.

4. The apparatus of claim 2, wherein the processor is further configured to:
   operate the light source intermittently; and
   receive the signal from the light source to determine if the housing cap is not properly mounted on the recharging inlet when the light source is turned on.

5. The apparatus of claim 1, wherein the "UNMATED" voltage level is detected on the "MATED" signal where a safety pin in the recharging inlet is not connected to a corresponding pin slot in the housing cap, and wherein the "MATED" voltage level is detected on the "MATED" signal where the safety pin is connected to the corresponding pin slot.

6. The apparatus of claim 5, wherein the processor is further configured to:
   operate the DC power source intermittently; and
   receive the signal from the "MATED" signal to determine if the housing cap is not properly mounted on the recharging inlet when the DC power source is turned on.

7. A method comprising:
   receiving a signal from a component in a recharging inlet of an electric powered vehicle (EPV);
   determining if the sinal indicates that a housing cap is not properly mounted on the recharging inlet; and
   alerting a driver if the signal indicates that the housing cap is not properly mounted on the recharging inlet, wherein the signal comprises an electric voltage level, and wherein an "UNMATED" voltage level indicates that the housing cap is not properly mounted on the recharging inlet, and wherein a "MATED" voltage level indicates that the housing cap is properly mounted on the recharging inlet.

8. The method of claim 7, wherein the "UNMATED" voltage level is detected where a light detector detects substantial light in the recharging inlet, and wherein the "MATED" voltage level is detected where the light detector does not detect substantial light in the recharging inlet.

9. The method of claim 8, further comprising:
receive a second signal from a second light detector in the recharging inlet;
determining if the second signal indicates that external light intensity is sufficient to determine without using the signal from the light source that the housing cap is not properly mounted on the recharging inlet; and
turning off the light source if external light intensity is sufficient to determine that the housing cap is not properly mounted on the recharging inlet.

10. The method of claim 8, further comprising:
operating the light source intermittently; and
receiving the signal from the light source to determine if the housing cap is not properly mounted on the recharging inlet when the light source is turned on.

11. The method of claim 7, wherein the "UNMATED" voltage level is detected on the "MATED" signal where a safety pin in the recharging inlet is not connected to a corresponding pin slot in the housing cap, and wherein the "MATED" voltage level is detected on the "MATED" signal where the safety pin is connected to the corresponding pin slot.

12. The method of claim 11, further comprising:
operating the DC power source intermittently; and
receiving the signal from the "MATED" signal to determine if the housing cap is not properly mounted on the recharging inlet when the DC power source is turned on.

13. A computer program product comprising:
a plurality of computer executable instructions stored on a non-transitory medium that when executed by a processor cause the processor to:
receive a signal from a component in a recharging inlet of an electric powered vehicle (EPV);
determine if the signal indicates that a housing cap is not properly mounted on the recharging inlet; and
alert a driver if the signal indicates that the housing cap is not properly mounted on the recharging inlet, wherein the signal comprises an electric voltage level, and wherein an "UNMATED" voltage level indicates that the housing cap is not properly mounted on the recharging inlet, and wherein a "MATED" voltage level indicates that the housing cap is properly mounted on the recharging inlet.

14. The computer program product of claim 13, wherein the "UNMATED" voltage level is detected where a light detector detects substantial light in the recharging inlet, and wherein the "MATED" voltage level is detected where the light detector does not detect substantial light in the recharging inlet.

15. The computer program product of claim 14, wherein the instructions further cause the processor to:
receive a second signal from a second light detector in the recharging inlet;
determine if the second signal indicates that external light intensity is sufficient to determine without using the signal from the light source that the housing cap is not properly mounted on the recharging inlet; and
turn off the light source if external light intensity is sufficient to determine that the housing cap is not properly mounted on the recharging inlet.

16. The computer program product of claim 14, wherein the instructions further cause the processor to:
operate the light source intermittently; and
receive the signal from the light source to determine if the housing cap is not properly mounted on the recharging inlet when the light source is turned on.

17. The computer program product of claim 13, wherein the "UNMATED" voltage level is detected on the "MATED" signal where a safety pin in the recharging inlet is not connected to a corresponding pin slot in the housing cap, and wherein the "MATED" voltage level is detected on the "MATED" signal where the safety pin is connected to the corresponding pin slot.

* * * * *